(12) United States Patent
Gerson

(10) Patent No.: US 10,890,478 B2
(45) Date of Patent: Jan. 12, 2021

(54) LEVEL INDICATOR

(71) Applicant: Fred B. Gerson, Jackson, TN (US)

(72) Inventor: Fred B. Gerson, Jackson, TN (US)

(*) Notice: Subject to any disclaimer, the term of this patent is extended or adjusted under 35 U.S.C. 154(b) by 126 days.

(21) Appl. No.: 16/391,360

(22) Filed: Apr. 23, 2019

(65) Prior Publication Data
US 2020/0080883 A1    Mar. 12, 2020

Related U.S. Application Data

(63) Continuation-in-part of application No. 15/614,520, filed on Jun. 5, 2017, now abandoned.

(60) Provisional application No. 62/392,593, filed on Jun. 6, 2016.

(51) Int. Cl.
| | | |
|---|---|---|
| *G01F 23/20* | (2006.01) | |
| *G01F 23/14* | (2006.01) | |
| *B65D 90/52* | (2006.01) | |
| *B65D 90/48* | (2006.01) | |
| *B60P 3/32* | (2006.01) | |
| *B60R 15/00* | (2006.01) | |
| *B60R 16/033* | (2006.01) | |

(52) U.S. Cl.
CPC ............. *G01F 23/20* (2013.01); *B60P 3/32* (2013.01); *B65D 90/48* (2013.01); *G01F 23/14* (2013.01); *B60R 15/00* (2013.01); *B60R 16/033* (2013.01); *B65D 2203/04* (2013.01)

(58) Field of Classification Search
CPC .......... G01F 23/00; G01F 23/14; G01F 23/20; G01F 23/205; B65D 90/52
See application file for complete search history.

*Primary Examiner* — Herbert K Roberts
(74) *Attorney, Agent, or Firm* — David J. Kreher

(57) ABSTRACT

The present disclosure reveals a level indicator for use with storage tanks on motorhomes or campers. The level indicator comprises a sensor attached to the bottom of a storage tank in order to allow easy access to replace the sensor in case of failure. The sensor is calibrated to indicate the amount of liquid above the sensor in the tank. As the level of the tank changes, a readout meter indicates the volume of liquid present by percentage.

8 Claims, 4 Drawing Sheets

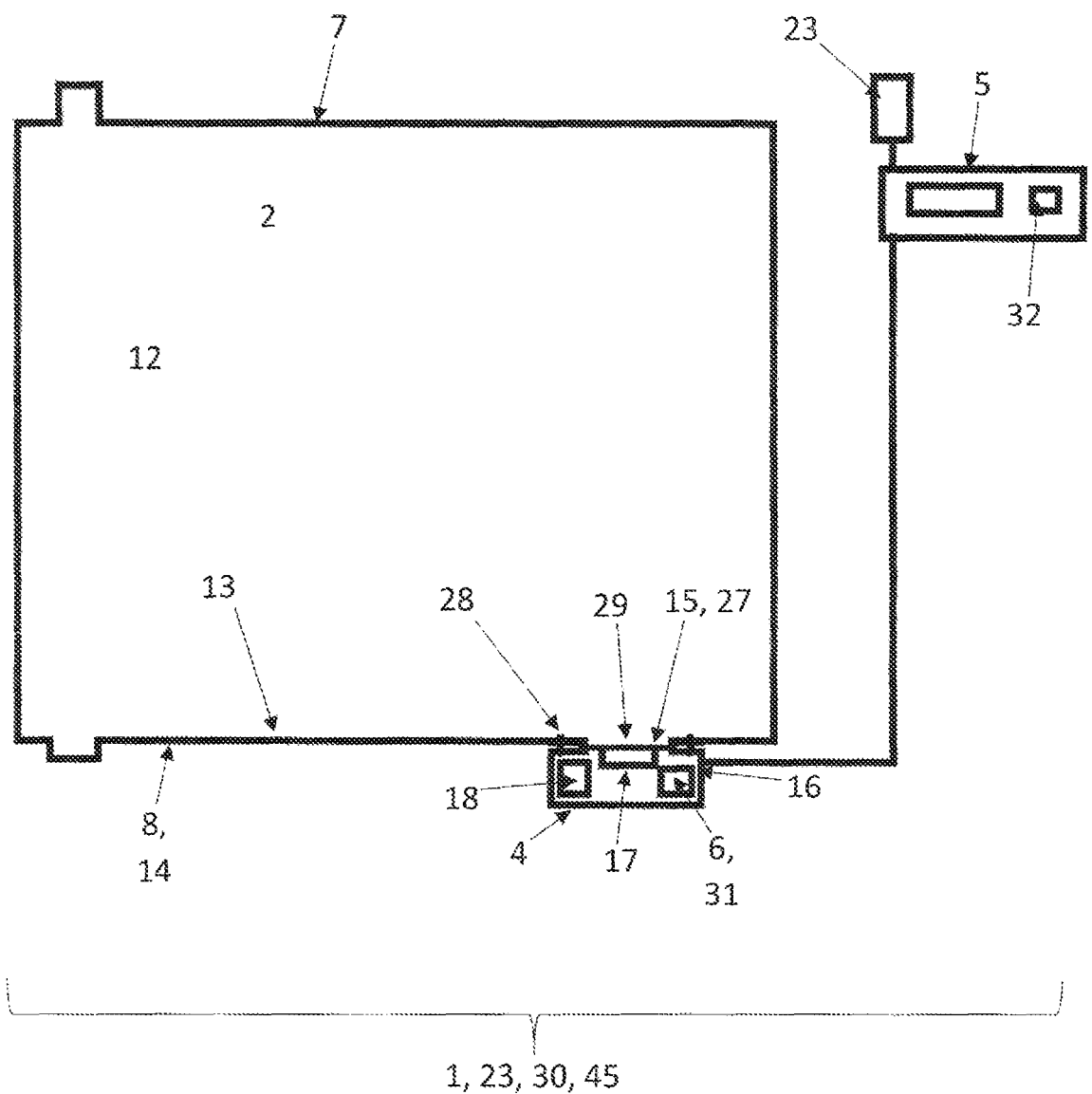

LEVEL INDICATOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This disclosure reveals a level indicator attached to the outside of a storage tank of a motorhome or camper wherein a sensor and meter that comprise the level indicator can be easily removed from the storage tank and replaced without the storage tank of the motorhome or camper being removed, the storage tank being disassembled or the storage tank being cut open.

Background of the Invention

This application claims the benefit of U.S. Provisional Application No. 62/392,593, filed Jun. 6, 2016 and Nonprovisional application Ser. No. 15/614,520, filed Jun. 5, 2017.

Motorhomes and/or campers frequently have multiple storage tanks to hold such liquids a fresh water, gray water and black water (holding human waste material such as urine and fecies). It is important to know how much liquid is in each of these containers so that the operator knows when to empty or fill these storage containers. Traditionally, the level of the liquid in these containers are monitored by apparatuses such as resistors or inductors such that, when the liquid rises to the level of a particular apparatus, that apparatus is activated and the readout meter indicates that the tank is full to a particular level. Unfortunately, these apparatuses, especially in black water storage tanks, frequently become corroded, worn out, or coated with material, which prevents these apparatuses from operating properly and then the apparatuses are difficult to replace without the removal of the tank from the vehicle, disassembly of the tank, or the cutting open of the tank in order. The present disclosure reveals an apparatus attached to the outside of a storage tank for the monitoring the level in the storage tank without the risk of corrosion or coating and whereby the apparatus can be easily replaced if the apparatus fails.

SUMMARY OF THE INVENTION

The present disclosure reveals a level indicator for use with storage tanks on motorhomes and/or campers, wherein the level indicator is attached to the outside of the storage tank. The level indicator comprises a sensor attached to the exterior bottom of the storage tank and in contact with the liquid within the storage tank through a hole on the bottom of the storage tank. The sensor comprises a load cell and the associated circuitry. The sensor is calibrated to indicate the amount of liquid above the sensor in the tank. As the volume of liquid within the tank changes, a readout meter indicates the amount of liquid as a percentage full.

The level indicator is powered either by a battery source in the sensor or is connected to the power supply system of the motorhome or camper. Measurements are conducted by the sensor either continuously, periodically, or when activated. To improve the accuracy of the measurements obtained, within the storage tank, baffles may be included or a tube placed above the sensor may be added.

BRIEF DESCRIPTION OF THE SEVERAL VIEWS OF THE DRAWING

FIG. 4 is a display of the level indicator where there is an on-off switch for the level indicator and the readout meter has a low battery indicator.

DETAILED DESCRIPTION OF THE INVENTION

Figure 1:
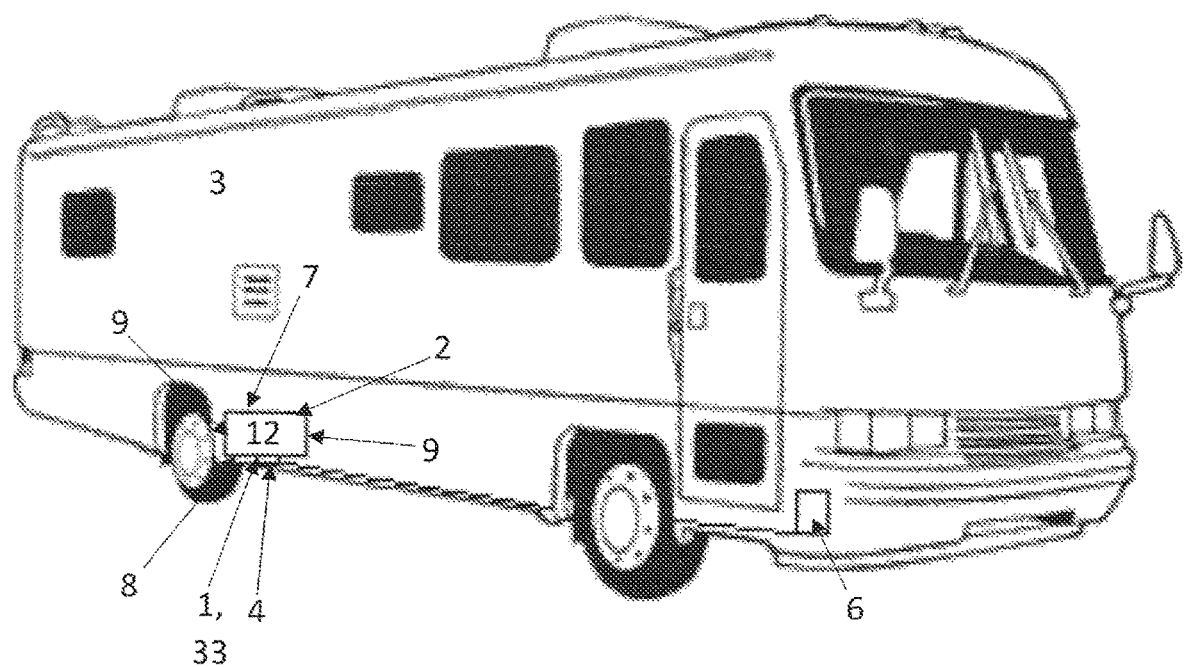
FIG. 1 is a display of the level indicator attached to the outside of a storage tank on a motorhome or camper, where the power supply of the level indicator is the DC power supply of the vehicle.
Figure 2:
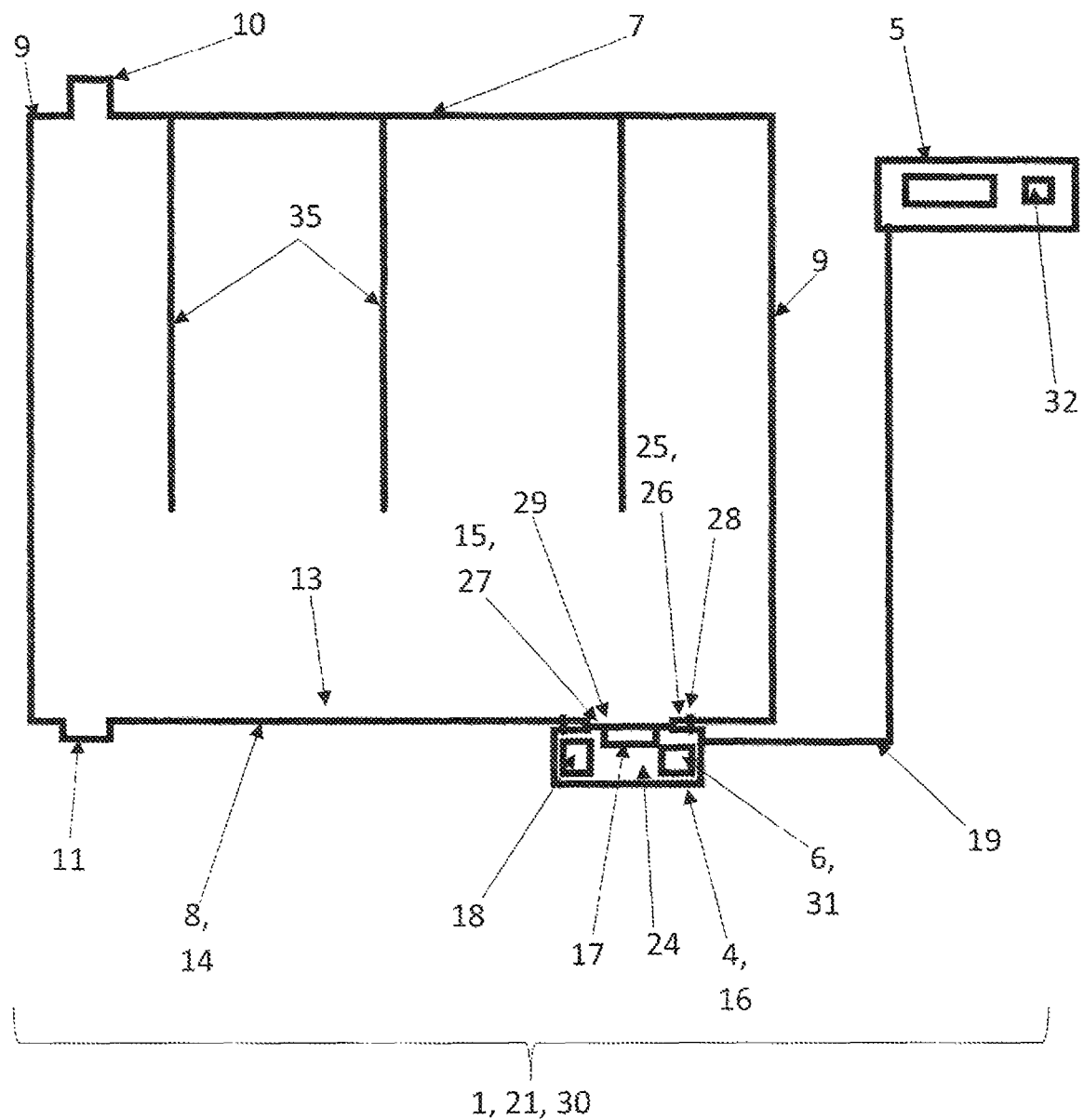
FIG. 2 is a display of the level indicator where the sensor produces a constant readout, there are a battery source within the storage case of the sensor to power the level indicator, and where there are baffles in the storage tank.
Figure 3:
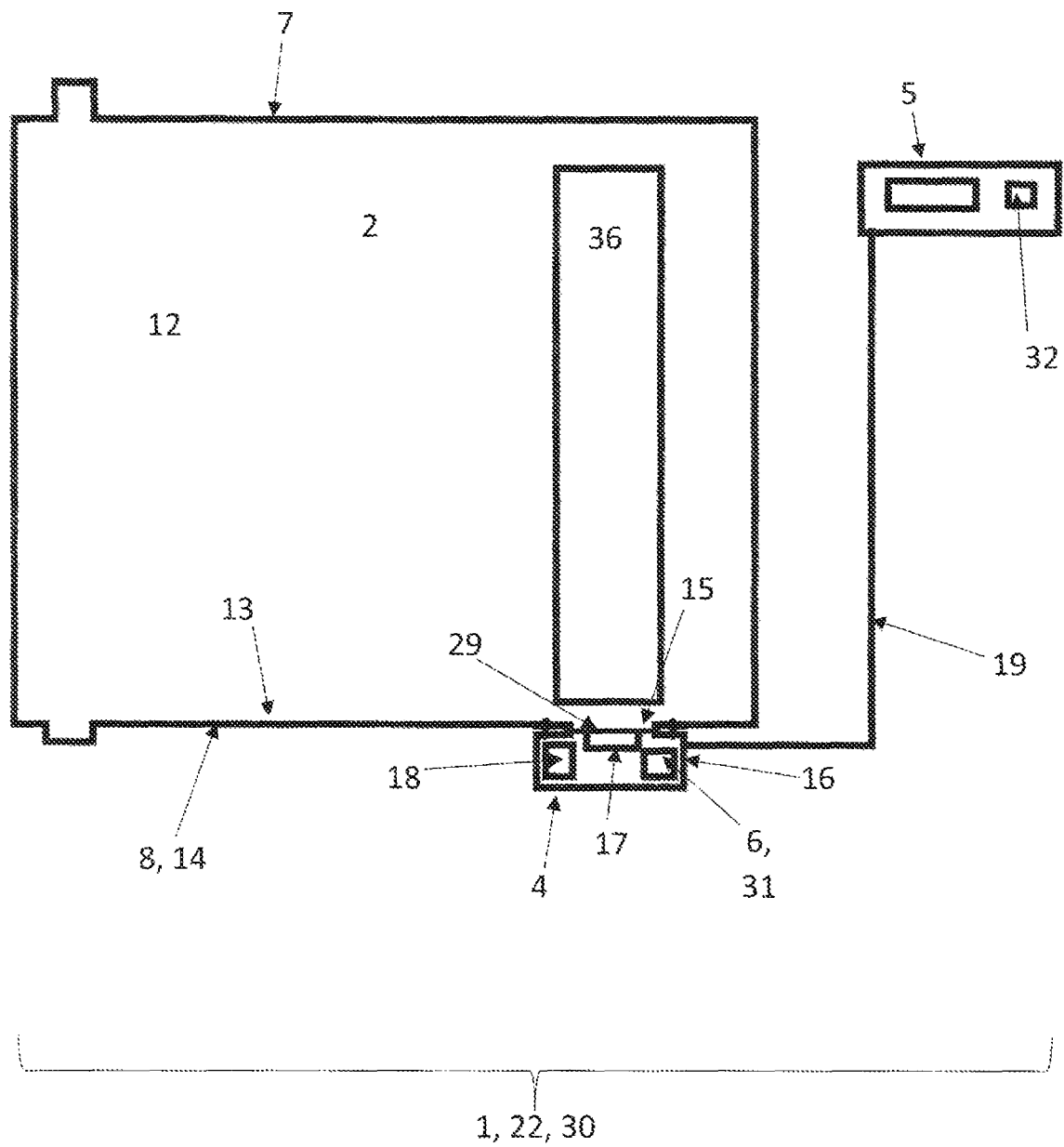
FIG. 3 is a display of the level indicator where the sensor produces a periodic readout and where there is a tube in the storage tank positioned above the load cell of the sensor.

The present disclosure reveals a level indicator 1 to measure the liquid within a storage tank 2, in particular, the black water storage tank of the motorhome or camper 3, wherein said storage tank 2 is located on a motorhome or camper 3, said level indicator 1 being attached to the exterior surface 14 bottom 8 of the storage tank 2, said level indicator 1 comprising a sensor 4, readout meter 5, and a power supply 6. The storage tank 2 on the motorhome or camper 3 is capable of holding liquid, said storage tank 2 comprising a top 7, a bottom 8, a plurality of sides 9, an inlet 10, an outlet 11, and an interior 12. The bottom 8 of the storage tank 2 comprising an inner surface 13, an exterior surface 14, and a hole 15.

The sensor 4 comprises a case 16, a load cell 17, circuitry 18 to operate the load cell 17, and a connection 19 to the readout meter. The load cell 17 is either a resistive load cell or a capacitive load cell. The load cell 17 and circuitry 18 are calibrated to indicate the quantity of liquid within the storage tank 2 based on the amount of liquid vertically above the load cell 17, with an output value indicated as a percentage on the readout meter 5. The sensor 4 may continuously 21 produce an output value, may produce an output value on a periodic basis 22 or there may be an on-off switch 23 for the level indicator 1 such that there is a continuous output value but only when the level indicator is on.

The case 16 of the sensor 4 comprises an interior 24 and a top 25. The circuitry 18 to operate the load cell 17 is located within the interior 24 of the case 16. The top 25 of the case comprises an upper surface 26 and a hole 27. The load cell 17 protrudes through the hole 27.

The sensor 4 is attached to the exterior surface 14 of the bottom 8 of the storage tank 2 by a plurality of fasteners 28, and the sensor 4 is positioned so that the hole 27 in the top 25 of the case 16 of the sensor 4 and the hole 15 in the bottom 8 of the storage tank 2 are aligned. The plurality of fasteners 28 may be of a material common in the industry such as an adhesive, screws, bolts, or bracing.

An impermeable flexible membrane 29 extends over the hole 15 and said impermeable flexible membrane 29 is attached to the exterior surface 14 of the bottom 8 of the storage tank 2 in a fashion so that the liquid contained in the storage tank 2 cannot leak through the hole 15 into the sensor 4, or out of the storage tank 2 when the sensor 4 is removed.

The readout meter is capable of presenting the output from the sensor.

In one embodiment 30 of the power supply 6 the power supply comprises a battery source 31 located within the case 16 of the sensor 4. In the first embodiment 30, there may also be a low battery indicator 32 on the readout meter 5. In a second embodiment 33 of the power supply 6 the motorhome or camper 3 comprises a DC power supply 34 and the power supply 6 for the level indicator 1 is derived from the DC power supply 34 of the motorhome or camper 3.

In order to minimize the impact of the liquid within the storage tank 2 from being jostled by the movement of the motorhome or camper 3 the interior 12 of the storage tank 2 may comprise a plurality of baffles 35 or a tube 36 positioned over the load cell 17.

What is claimed:

1. A level indicator for use in a storage tank on a motorhome or camper or any other liquid storage tank or vessel, said level indicator comprising:
    a sensor, readout meter, and a power supply;
    wherein the storage tank on the motorhome or camper is capable of holding liquid, said storage tank comprising a top, a bottom, a plurality of sides, an inlet, an outlet, and an interior;
    the bottom of the storage tank comprising an inner surface, an exterior surface, and a hole;
    said sensor comprising a case, a load cell, circuitry to operate the load cell, the power supply, and a connection to the readout meter;
    the load cell and circuitry being calibrated to indicate a quantity of liquid within the storage tank based on an amount of liquid vertically above the load cell, and configured to generate an output value corresponding to the quantity of liquid within the storage tank indicated as a percentage of a total storage volume of the storage tank;
    said case comprising an interior and a top;
    the circuitry to operate the load cell being located within the interior of the case;
    the top of the case comprising an upper surface and a hole;
    the load cell protrudes through the hole in the bottom of the storage tank;
    the sensor being attached to the exterior surface of the bottom of the storage tank, so that the sensor is removable without removing the storage tank from the motorhome or camper, disassembling the storage tank, or cutting open the storage tank, and so that the sensor is easily accessible and removable, positioned so that the hole in the top of the case of the sensor and the hole in the bottom of the storage tank are aligned;
    the sensor being attached to the bottom of the exterior of the storage tank by a plurality of fasteners;
    wherein the power supply comprises at least one of a battery source located within the case of the sensor or the motorhome or camper comprises a DC power supply and the power supply for the sensor is derived from the DC power supply of the motorhome or camper;
    an impermeable flexible membrane extends over the hole in the storage tank and said impermeable flexible membrane is attached to the exterior surface of the bottom of the storage tank in a fashion so that the liquid contained in the storage tank cannot leak through the hole of the storage tank into the sensor, or out of the storage tank when the sensor is removed; and
    the readout meter capable of presenting the output from the sensor.

2. The level indicator of claim 1 wherein the sensor continuously produces an output value.

3. The level indicator of claim 2 wherein within the interior of the storage tank there are a plurality of baffles to minimize jostling of the liquid within the storage tank as the motorhome or camper is moving.

4. The level indicator of claim 2 wherein within the interior of the storage tank there is a tube positioned over the load cell to minimize jostling of the liquid within the storage tank as the motorhome or camper is moving.

5. The level indicator of claim 2 wherein the sensor periodically produces an output value.

6. The level indicator of claim 5 wherein within the interior of the storage tank there are a plurality of baffles to minimize jostling of the liquid within the storage tank as the motorhome or camper is moving.

7. The level indicator of claim 5 wherein within the interior of the storage tank there is a tube positioned over the load cell to minimize jostling of the liquid within the storage tank as the motorhome or camper is moving.

8. The level indicator of claim 2 wherein the sensor can be manually turned on and off by a switch so that the sensor produces an output value.

\* \* \* \* \*